(12) United States Patent
Huang

(10) Patent No.: US 8,767,897 B2
(45) Date of Patent: Jul. 1, 2014

(54) APPARATUS AND METHOD FOR TIMING ERROR DETECTION DECISION LOCK

(75) Inventor: Kung-Piao Huang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 607 days.

(21) Appl. No.: 12/905,881

(22) Filed: Oct. 15, 2010

(65) Prior Publication Data
US 2011/0133785 A1    Jun. 9, 2011

(30) Foreign Application Priority Data

Dec. 4, 2009   (TW) ................ 98141608 A

(51) Int. Cl.
    *H04L 7/00*     (2006.01)
(52) U.S. Cl.
    USPC ........................................................ 375/355
(58) Field of Classification Search
    USPC ........................................................ 375/355
    See application file for complete search history.

(56) References Cited

U.S. PATENT DOCUMENTS

| 2005/0276200 A1* | 12/2005 | Niwa ................. 369/59.19 |
| 2006/0146954 A1* | 7/2006 | Markman et al. ............ 375/270 |
| 2007/0133667 A1* | 6/2007 | Jin et al. .................. 375/226 |

FOREIGN PATENT DOCUMENTS

| CN | 1714567 A | 12/2005 |
| TW | 440754 B | 6/2001 |
| TW | 200820631 A | 5/2008 |
| WO | WO-2004049706 A2 | 6/2004 |

* cited by examiner

*Primary Examiner* — Chieh M Fan
*Assistant Examiner* — Tanmay Shah
(74) *Attorney, Agent, or Firm* — Rabin & Berdo, P.C.

(57) ABSTRACT

A method for timing error detection decision lock includes the following steps. Multiple detected values are obtained from a transmission signal. A moving sum mean signal is obtained according to the detected values. The moving sum mean signal is sampled every second constant period to obtain multiple sampling values. Whether the transmission signal is in a timing-lock status or an un-timing-lock status is determined according to relative relationships between the sampling values.

5 Claims, 7 Drawing Sheets

APPARATUS AND METHOD FOR TIMING ERROR DETECTION DECISION LOCK

This application claims the benefit of Taiwan application Serial No. 98141608, filed Dec. 4, 2009, the subject matter of which is incorporated herein by reference.

BACKGROUND OF THE INVENTION

1. Field of the Invention

The invention relates in general to an apparatus and a method for timing error detection decision lock, and more particularly to an apparatus and a method for the reliable timing error detection decision lock.

2. Description of the Related Art

FIG. 1 (Prior Art) is a block diagram showing a conventional apparatus 100 for timing error detection decision lock. Referring to FIG. 1, the conventional apparatus 100 includes a lock detector 110, a mean unit 120 and a decision unit 130. The lock detector 110 obtains multiple detected values from a transmission signal. The mean unit 120 receives the detected values, and averages every N detected values to obtain multiple means. For example, the mean unit 120 averages the detected values d1 to d4 to obtain a mean a1, and averages the detected values d5 to d8 to obtain a mean a2, and so on.

The decision unit 130 determines whether the means obtained by the mean unit 120 are greater than a detected threshold value or not. FIG. 2 (Prior Art) is a schematic illustration showing a conventional decision lock. In FIG. 2, when the means are greater than a detected threshold value LTH, the decision unit 130 determines the transmission signal as in a timing-lock status. However, the output of the mean unit 120 tends to be affected by the external factors, such as noises, frequency offsets or neighboring channels, so that the decision unit 130 has the incorrect determination. In addition, if the detected threshold value LTH is set to be too low, then the transmission signal, which has not yet entered the timing-lock status, may be incorrectly determined, by the decision unit 130, as in the timing-lock status. On the contrary, if the detected threshold value LTH is set to be too high, then the transmission signal, which has entered the timing-lock status, cannot be correctly determined as entering the timing-lock status. Thus, the decision unit 130 has to set different detected threshold values LTH corresponding to various conditions, and the constant detected threshold value LTH cannot be adopted to handle all the conditions.

SUMMARY OF THE INVENTION

The invention is directed to an apparatus and a method for timing error detection decision lock, wherein a transmission signal is determined as in a timing-lock status or an un-timing-lock status by determining a fluctuation trend of a moving sum mean.

According to a first aspect of the present invention, an apparatus for timing error detection decision lock including a lock detector, a moving sum mean calculator and a decision indicator is provided. The lock detector obtains multiple detected values from a transmission signal. The moving sum mean calculator obtains a moving sum mean signal according to the detected values. The decision indicator samples the moving sum mean signal every second constant period to obtain multiple sampling values, and determines the transmission signal as in a timing-lock status or an un-timing-lock status according to relative relationships between the sampling values.

According to a second aspect of the present invention, a method for timing error detection decision lock is provided. The method includes the following steps. Multiple detected values are obtained from a transmission signal. A moving sum mean signal is obtained according to the detected values. The moving sum mean signal is sampled every second constant period to obtain multiple sampling values, and the transmission signal is determined as in a timing-lock status or an un-timing-lock status according to relative relationships between the sampling values.

The invention will become apparent from the following detailed description of the preferred but non-limiting embodiments. The following description is made with reference to the accompanying drawings.

DETAILED DESCRIPTION OF THE INVENTION

The invention provides an apparatus and a method for timing error detection decision lock, wherein a transmission signal can be effectively determined as in a timing-lock status or an un-timing-lock status by determining a fluctuation trend of a moving sum mean of detected values of the transmission signal.

Figure 1:
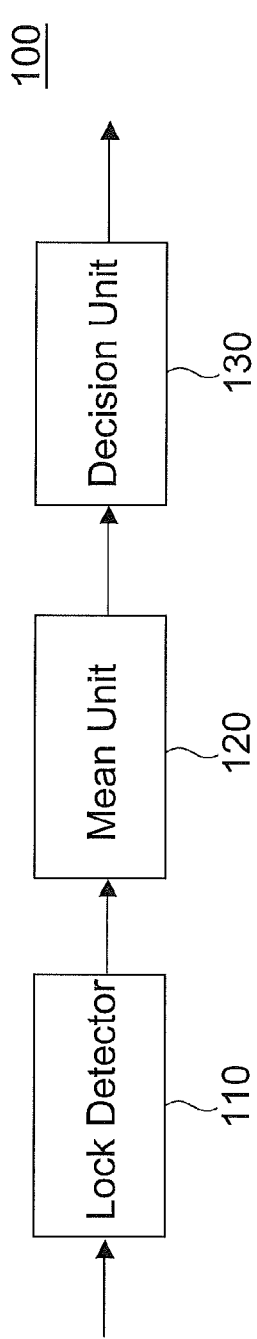
FIG. 1 (Prior Art) is a block diagram showing a conventional apparatus for timing error detection decision lock.
Figure 2:
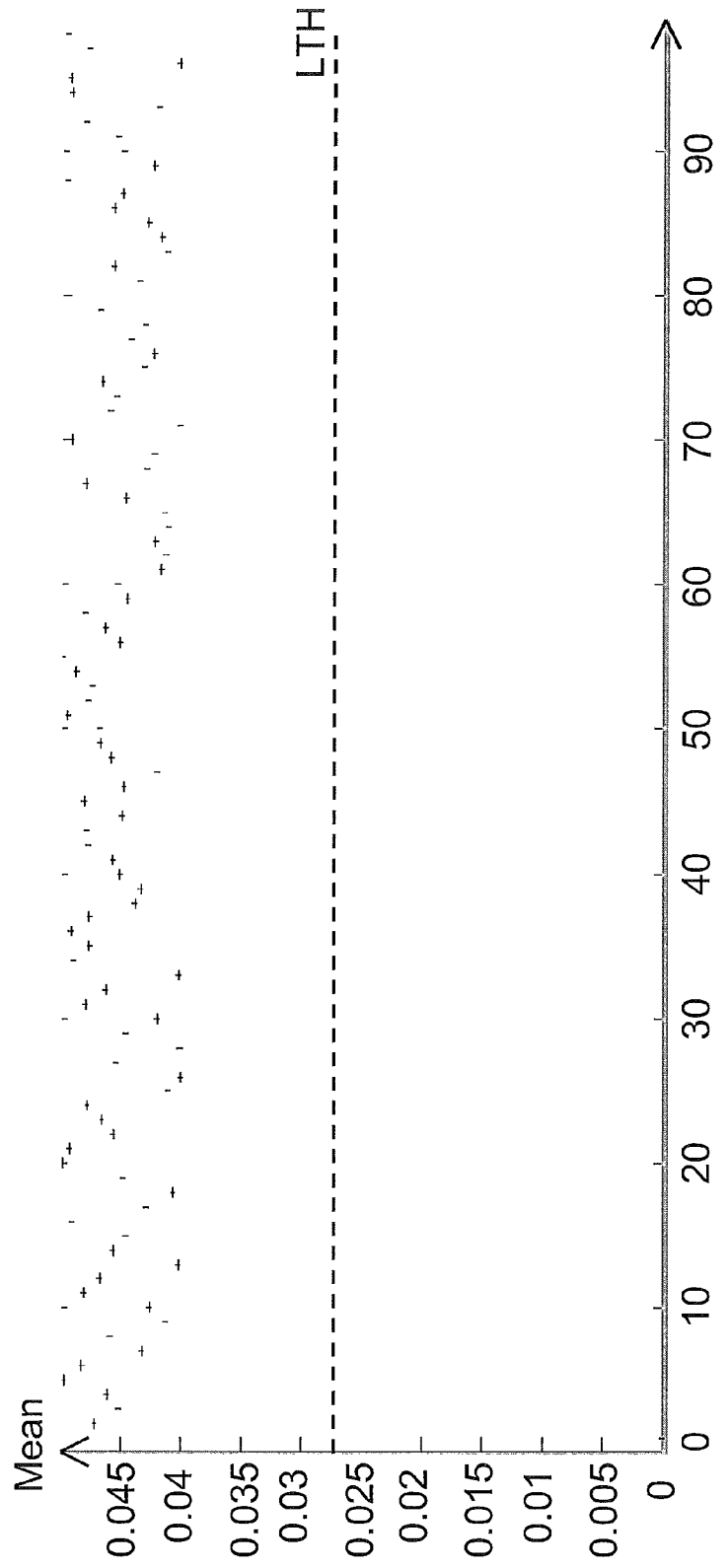
FIG. 2 (Prior Art) is a schematic illustration showing a conventional decision lock.
Figure 3:
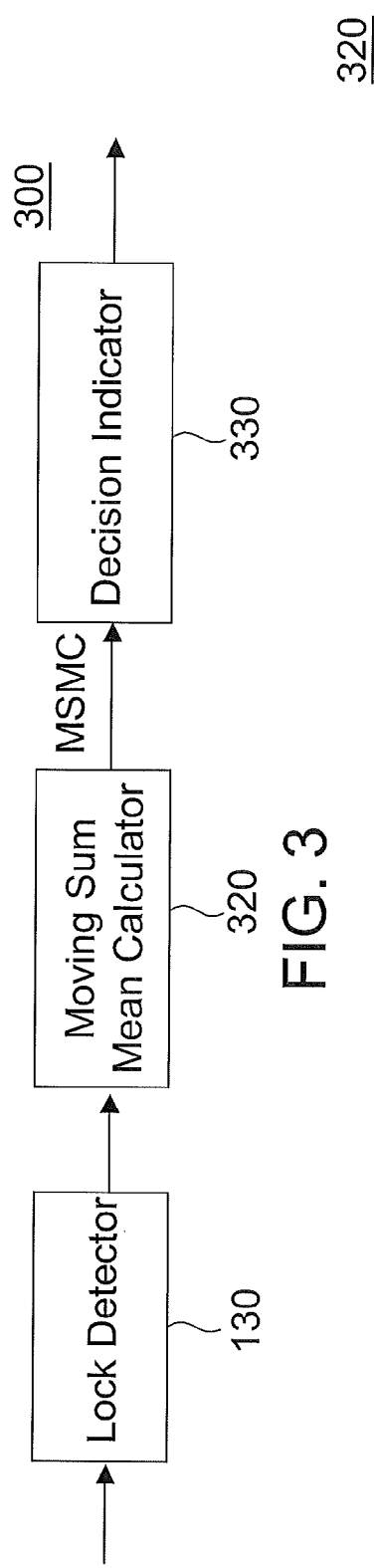
FIG. 3 is a block diagram showing an apparatus for timing error detection decision lock according to a preferred embodiment of the invention.

FIG. 3 is a block diagram showing an apparatus 300 for timing error detection decision lock according to a preferred embodiment of the invention. Referring to FIG. 3, the apparatus 300 includes a lock detector 310, a moving sum mean calculator 320 and a decision indicator 330. The lock detector 310 obtains multiple detected values from a transmission signal. The moving sum mean calculator 320 obtains a moving sum mean signal according to the detected values.

Figure 4:
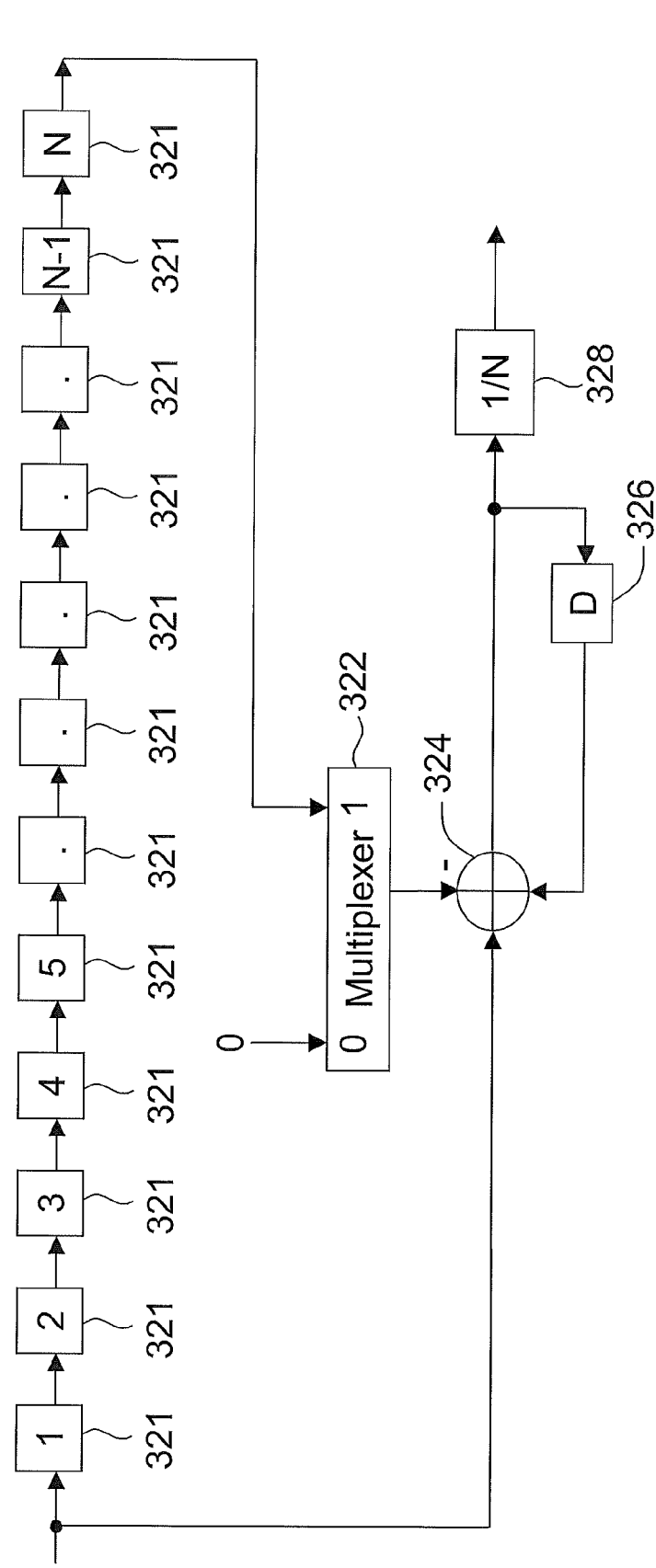
FIG. 4 is a block diagram showing an example of a moving sum mean calculator according to the preferred embodiment of the invention.
Figure 5:
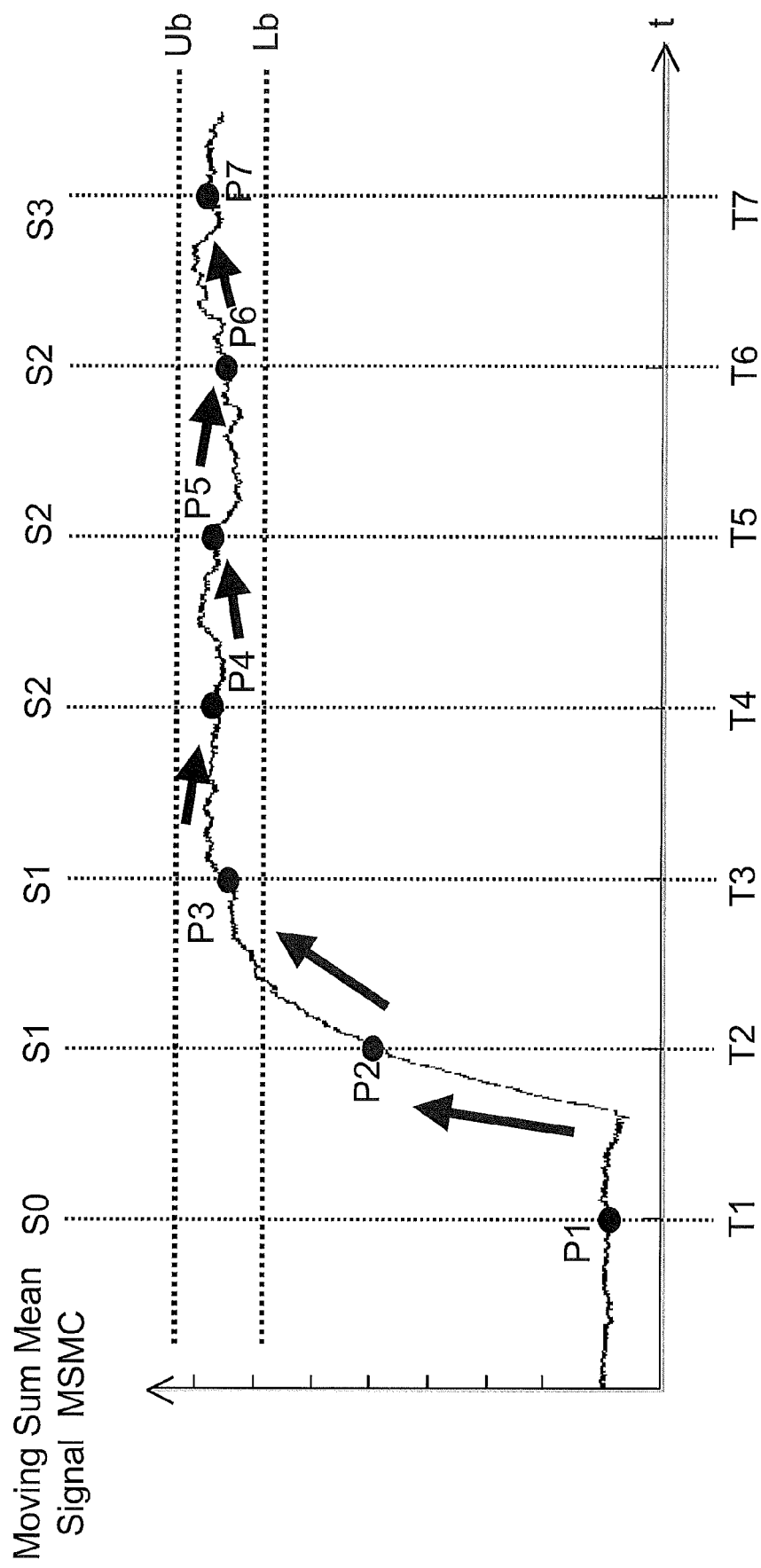
FIG. 5 shows a waveform of a moving sum mean signal according to the preferred embodiment of the invention.

FIG. 4 is a block diagram showing an example of a moving sum mean calculator according to the preferred embodiment of the invention. Referring to FIG. 4, the moving sum mean calculator 320 includes N delay lines 321, a multiplexer 322, an adder 324, a delayer 326 and a divider 328. As shown in FIG. 4, the moving sum mean calculator 320 receives the detected values and performs a moving sum mean on the detected values to obtain multiple moving sum means. It is assumed that the detected values are d1 to d(2N), for example, the moving sum means are sequentially d1/N, (d1+d2)/N, (d1+d2+d3)/N, ..., (d1+ ... +d(N−1))/N, (d1+ ... +dN)/N, (d2+ ... +d(N+1))/N, (d3+ ... +d(N+2))/N, ..., (d(2N−1)+ ... +d(2N))/N. The moving sum means are outputted, from the moving sum mean calculator 320, as a moving sum mean signal. FIG. 5 shows a waveform of the moving sum mean signal according to the preferred embodiment of the invention.

The decision indicator 330 samples the moving sum mean signal every second constant period to obtain multiple sampling values, and determines the transmission signal as in a timing-lock status or an un-timing-lock status according to relative relationships between the sampling values. According to FIG. 5, it is observed that the decision indicator 330 samples the moving sum mean signal every second constant period (T1, T2, ..., T7, ...) to obtain multiple sampling values (P1, P2, ..., P7, ...). Due to the property of the moving sum mean calculator 320, the moving sum mean signal approaches a stable condition if the transmission signal is in the timing-lock status, and the values (e.g., P3 to P7) oscillate within a narrow range between an upper bound UB and a lower bound LB without too significant variations. Thus, the decision indicator 330 calculates the ratios each between neighboring two of the sampling values, and thus determines the fluctuation trend of the moving sum mean signal according to the ratios. When the fluctuation trend of the moving sum mean signal becomes stable, the decision indicator 330 determines the transmission signal as in the timing-lock status.

Figure 6:
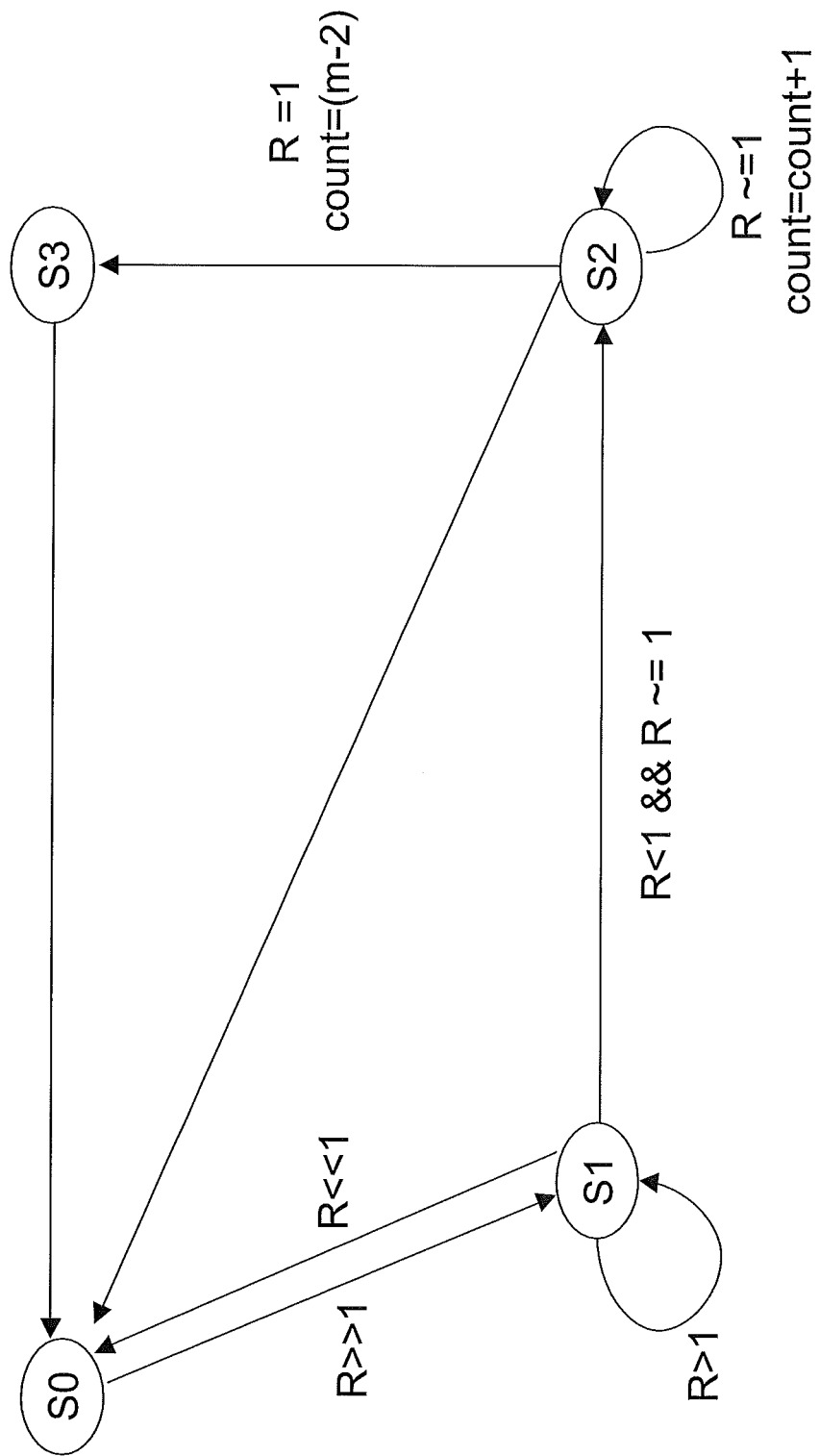
FIG. 6 shows the status of the timing error detection decision lock according to the preferred embodiment of the invention.

The decision indicator 330 substantially includes a status machine. FIG. 6 shows the status of the timing error detection decision lock according to the preferred embodiment of the invention. In FIG. 6, a ratio R between neighboring two of the sampling values is defined as a current sampling value divided by a previous sampling value, and the initial status is the zeroth status S0. Illustrations will be made with reference to FIG. 5. In FIG. 5, a ratio R of the sampling point P2 to the sampling point P1 is far greater than 1 (or greater than a first predetermined value, such as 50), and the status machine switches from the zeroth status S0 to the first status S1. The ratio R of the sampling point P3 to the sampling point P2 is greater than 1 and smaller than the first predetermined value but does not approach 1, and the status machine is kept in the first status S1.

The ratio R of the sampling point P4 to the sampling point P3 is smaller than 1 and approaches 1, and the status machine switches from the first status S1 to a second status S2. The ratio R of the sampling point P5 to the sampling point P4 approaches 1, and the status machine is kept in the second status S2. In addition, a count value is up-counted by 1. When the status machine is kept in the second status for continuous (m−1) periods, the count value is up-counted to (m−2), and the status machine switches from the second status S2 to a third status S3, such that the decision indicator 330 determines the transmission signal as in the timing-lock status. In this invention, m is a second predetermined value, and the first and second predetermined values are determined according to the user's requirements and are not particularly restricted.

Figure 7:
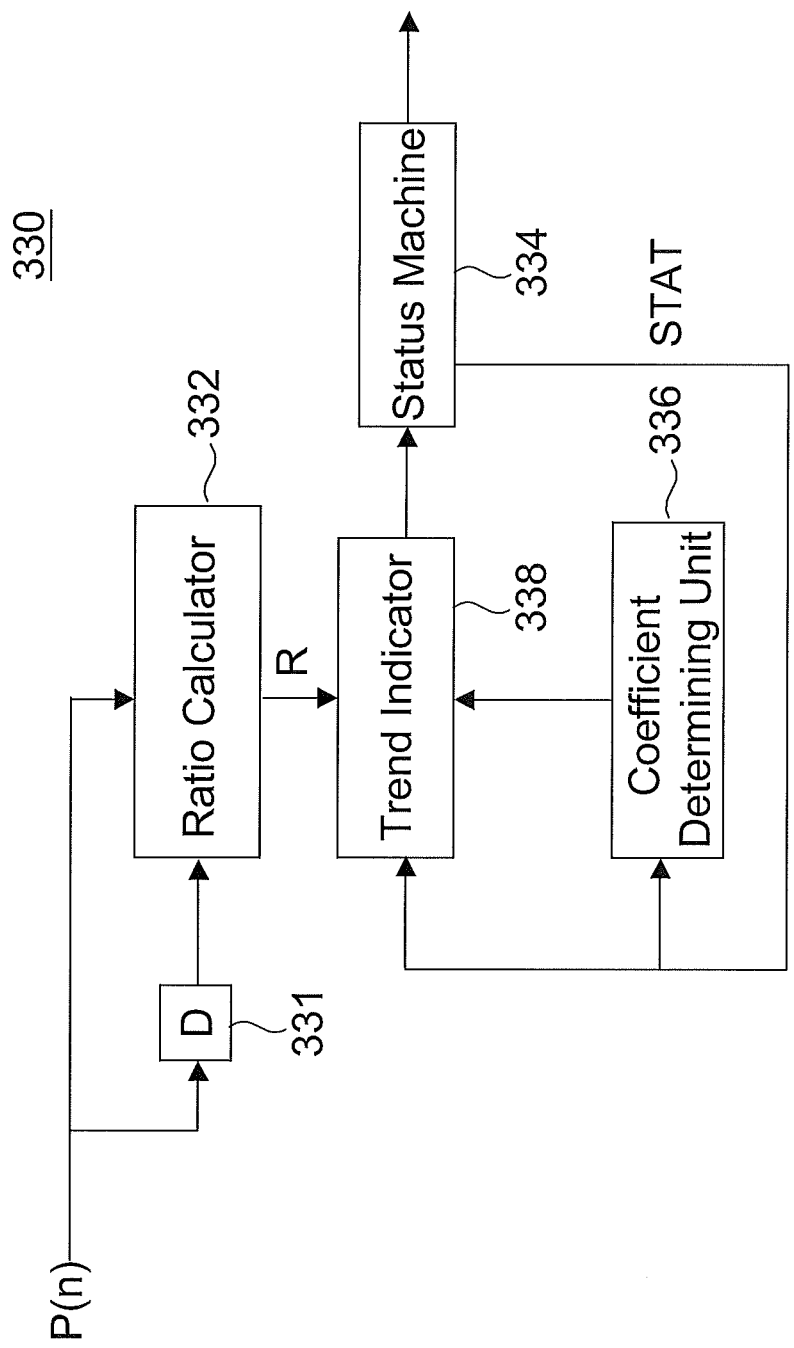
FIG. 7 is a block diagram showing an example of a decision indicator according to the preferred embodiment of the invention.

FIG. 7 is a block diagram showing an example of the decision indicator 330 according to the preferred embodiment of the invention. Referring to FIG. 7, the decision indicator 330 includes a delayer 331, a ratio calculator 332, a status machine 334, a coefficient determining unit 336 and a trend indicator 338. The delayer 331 is coupled to the moving sum mean calculator 320. The ratio calculator 332, coupled to the moving sum mean calculator 320 and the delayer 331, obtains the ratio R between neighboring two of the sampling values. The status machine 334 switches to one of the zeroth status S0 to the third status S3. The coefficient determining unit 336 is controlled by the status machine 334 to output multiple coefficients C1 to C4 corresponding to the status of the status machine 334. The trend indicator 338, coupled to the ratio calculator 332 and controlled by the status machine 334, controls the status machine 334 to switch the status according to the ratio R and the coefficients C1 to C4.

Figure 8:
FIG. 8 is a block diagram showing an example of a trend indicator according to the preferred embodiment of the invention.
Figure 8:
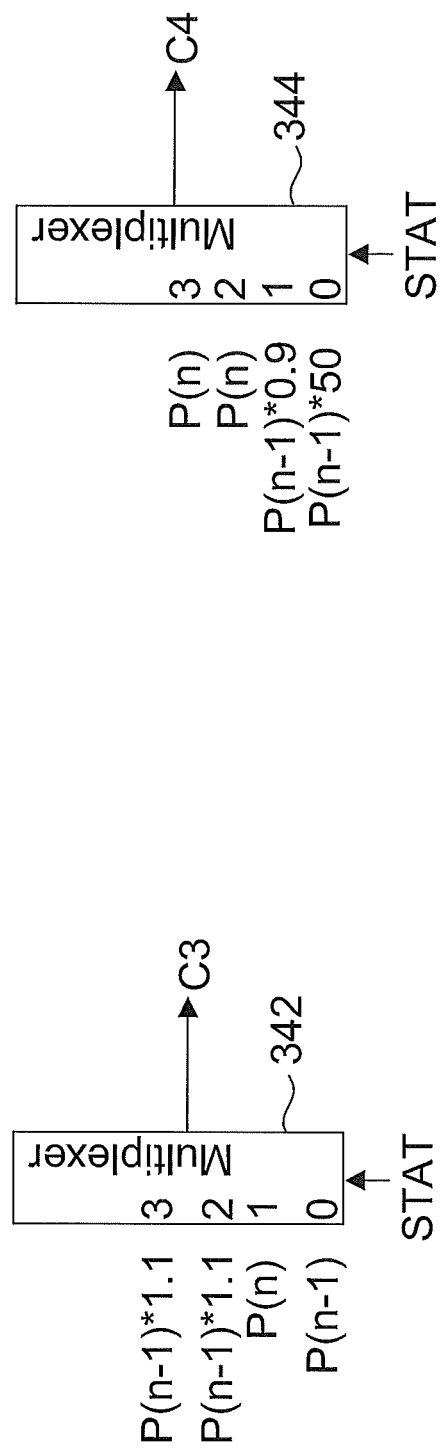
Figure 9:
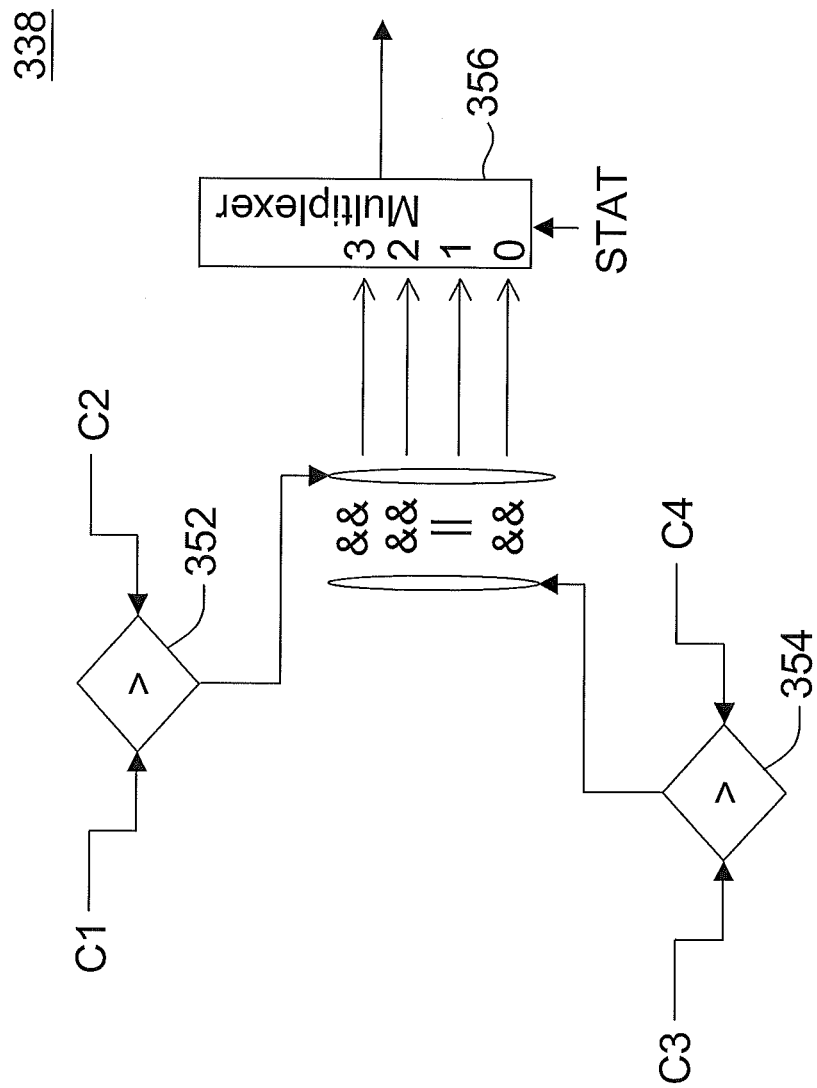
FIG. 9 is a block diagram showing an example of a coefficient determining unit according to the preferred embodiment of the invention.

FIG. 8 is a block diagram showing an example of a trend indicator according to the preferred embodiment of the invention. FIG. 9 is a block diagram showing an example of a coefficient determining unit according to the preferred embodiment of the invention. In the non-restrictive example of FIG. 8, the first predetermined value is 50, and the ratio R approaching 1 ranges from 0.9 to 1.1. The coefficient determining unit 336 utilizes multiple multiplexers 340 to 344 to determine the values of the output coefficients C1 to C4 according to the output STAT of the status machine 334. In the trend indicator 338, the comparators 352 and 354 compare the coefficients C1 to C4 with each one another, and the multiplexer 356 controls the status machine 334 to switch or keep the status according to the output STAT of the status machine 334 and the comparison results of the comparators 352 and 354.

The invention also discloses a method for timing error detection decision lock. The method includes the following steps. Multiple detected values are obtained from a transmission signal. A moving sum mean signal is obtained according to the detected values. The moving sum mean signal is sampled to obtain multiple sampling values every second constant period, and the transmission signal is determined as in the timing-lock status or the un-timing-lock status according to relative relationships between the sampling values.

The principle of the method for the timing error detection decision lock has been described in the apparatus 300 for the timing error detection decision lock with reference to FIGS. 3 to 9, so detailed descriptions thereof will be omitted.

The apparatus and method for the timing error detection decision lock according to the embodiment of the invention have many advantages, some of which will be listed and described in the following.

In the apparatus and method for the timing error detection decision lock, the moving sum means of the detected values of the transmission signal are calculated to generate a moving sum mean signal, and it is determined whether the fluctuation trend of the moving sum mean signal is stable or not. When the fluctuation trend of the moving sum mean signal satisfies the determination standard, it is determined that the transmission signal is in the timing-lock status, or otherwise the transmission signal is in the un-timing-lock status. Consequently, the status of the transmission signal can be effectively determined without resetting the suitable detected threshold values for various conditions, and the reliability of the timing error detection decision lock in the whole system can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for timing error detection decision lock, the apparatus comprising:
    a lock detector for obtaining a plurality of detected values from a transmission signal;

a moving sum mean calculator for obtaining a moving sum mean signal according to the detected values; and a decision indicator for sampling the moving sum mean signal every constant period to obtain a plurality of sampling values, and determining whether the transmission signal is in a timing-lock status or an un-timing-lock status according to relative relationships between the sampling values;

wherein the decision indicator further calculates ratios each between neighboring two of the sampling values, and thus determines a fluctuation trend of the moving sum mean signal, wherein the decision indicator determines that the transmission signal is in the timing-lock status when the fluctuation trend of the moving sum mean signal is stable.

2. The apparatus according to claim 1, wherein the decision indicator comprises a status machine, a ratio between neighboring two of the sampling values is defined as a current sampling value divided by a previous sampling value, the status machine switches from a zeroth status to a first status when an $n^{th}$ ratio is greater than a first predetermined value, the status machine switches from the first status to a second status when an $(n+1)^{th}$ ratio is smaller than 1 and approaches 1, and the status machine switches from the second status to a third status when an $(n+2)^{th}$ ratio to an $(n+m)^{th}$ ratio approach 1 such that the decision indicator determines the transmission signal as in the timing-lock status, wherein m is a second predetermined value, and n and m are positive integers.

3. The apparatus according to claim 2, wherein the decision indicator further comprises:

a delayer coupled to the moving sum mean calculator;

a ratio calculator, coupled to the moving sum mean calculator and the delayer, for obtaining ratios each between neighboring two of the sampling values;

a coefficient determining unit, controlled by the status machine to output a plurality of coefficients corresponding to the status of the status machine; and a trend indicator, coupled to the ratio calculator and controlled by the status machine, for controlling the status machine to switch the status according to the ratios and the coefficients.

4. A method for timing error detection decision lock, the method comprising:

obtaining a plurality of detected values from a transmission signal;

obtaining a moving sum mean signal according to the detected values; and sampling the moving sum mean signal every constant period to obtain a plurality of sampling values;

calculating ratios each between neighboring two of the sampling values, and thus determining a fluctuation trend of the moving sum mean signal according to the ratios; and determining the transmission signal as in the timing-lock status when the fluctuation trend of the moving sum mean signal is stable.

5. The method according to claim 4, further comprising:

defining a ratio between neighboring two of the sampling values as being obtained by a current sampling value divided by a previous sampling value;

switching from a zeroth status to a first status when a $n^{th}$ ratio is greater than a first predetermined value, wherein n is a positive integer;

switching from the first status to a second status when an $(n+1)^{th}$ ratio is smaller than 1 and approaches 1; and switching from the second status to a third status and determining the transmission signal as in the timing-lock status when an $(n+2)^{th}$ ratio to an $(n+m)^{th}$ ratio approach 1, wherein m is a second predetermined value, and m is a positive integer.

* * * * *